E. BENEDICTUS.
REINFORCED GLASS AND PROCESS OF MANUFACTURING THE SAME.
APPLICATION FILED JAN. 11, 1910.

1,098,342.

Patented May 26, 1914.

WITNESSES
L. H. Grote
W. E. Keir

INVENTOR
EDOUARD BENEDICTUS
BY Howson and Howson
his Attorneys

UNITED STATES PATENT OFFICE.

EDOUARD BENEDICTUS, OF PARIS, FRANCE.

REINFORCED GLASS AND PROCESS OF MANUFACTURING THE SAME.

1,098,342.          Specification of Letters Patent.       Patented May 26, 1914.

Application filed January 11, 1910. Serial No. 537,557.

*To all whom it may concern:*

Be it known that I, EDOUARD BENEDICTUS, a citizen of the French Republic, and residing at 25 Rue Foureroy, Paris, France, artistic painter, have invented a certain new and useful Reinforced Glass and Process of Manufacturing the Same, of which the following is a full, clear, and exact description.

This invention relates to the application of sheet celluloid for strengthening or backing glass and it has reference more particularly to a product formed of two sheets of glass united by the interposition and sticking or pasting between them of a sheet of celluloid.

Figure 1:
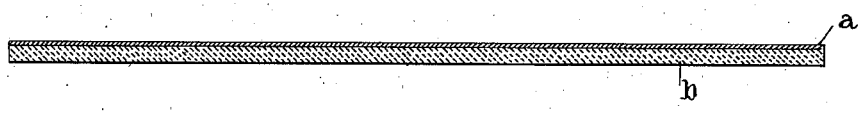
Figure 2:
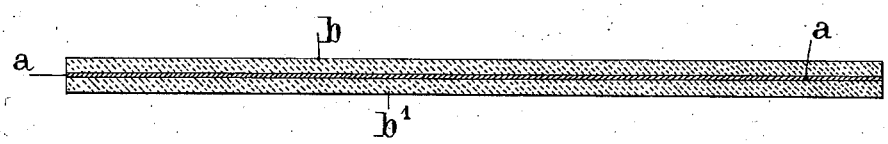

In the accompanying drawing:—Figure 1 is a cross section through a sheet of glass with the reinforcing sheet of celluloid above the same; Fig. 2 is a cross section through two sheets of glass with the reinforcing sheet of celluloid interposed.

This new industrial product presents in particular the following essential characteristics:—Its resistance to blows or shocks is much greater than that of ordinary glass. In case of breakage the glass cracks or "stars" without becoming detached from the backing of celluloid which supports it. It is therefore particularly applicable for the construction of the window panes and screens of vehicles (automobiles, cabs, carriages, omnibuses, railway carriages, boats, and the like). Owing to its resistant strength it on the one hand diminishes the chances of breakage and on the other hand especially it renders practically impossible personal injuries or wounds which might result from the breakage of windows and of glass. Its application is also appropriate to window panes, lights and the like of houses because its resistance to breakage or perforation enables it to oppose an efficacious defense to burglars who might attempt to get through without noise into an isolated house, whether inhabited or not.

The manufacture of this strengthened or backed glass, as in Fig. 1 for example, is very simple. I propose to arrange between two sheets of glass $b$—$b^1$ (Fig. 2) a sheet of celluloid $a$ coated with a suitable solvent (acetone, for example) and to submit the whole to pressure; for this purpose hydraulic pressure is to be recommended since by this means considerable pressure may be obtained. The sizes of the sheets of glass and of celluloid may be as desired. The celluloid may be extremely thin. It may be applied, if desired, in the pasty form, by coating one of the sheets of glass with a layer of celluloid in solution and by compressing the other sheet of glass upon it; but I consider this procedure less practical.

The sheets of glass to be assembled together need not be strictly flat; the want of planity of window glass so far from being an inconvenience actually becomes a condition very favorable to the resistant strength of the product, if care be taken to assemble the sheets, the convexity of one sheet being turned together the convexity of the other sheet.

The transparency of the product is quite comparable with that of pane glass, but I may of course employ in this manufacture, in lieu of transparent celluloid, colored or ornamented celluloid, interposed between sheets of glass which themselves may be transparent or ornamented. I can obtain in this way quite original effects in glass windows.

Instead of two sheets of glass, I may use three or a larger number between which are placed as many sheets of celluloid as is necessary. I may also secure in an adhesive manner a sheet of celluloid to a single sheet of glass.

Although the use of celluloid appears preferable by reason of its solidity, I may replace it by sheets of viscose, casein or other translucent and strong material which will enable the sheets of glass to be stuck together. In the subjoined claims I, of course, use the expression celluloid in a sense broad enough to include its equivalents.

Having thus described my invention what I claim as such and desire to secure by Letters Patent is:—

1. As a new article of manufacture laminated, adherent sheets of glass and flexible celluloid, the surface of the celluloid firmly adhering to the glass whereby a composite is provided having substantially the transparency of glass, the adhesion and strength of the celluloid being such as to reinforce the structure, resist rupture and prevent the scattering of glass fragments on the breakage of the glass.

2. As a new article of manufacture, a sheet of flexible celluloid faced on both sides by glass and firmly united thereto by an antogeneous joint, the transparency of the composite being substantially that of glass, and the celluloid and its adhesion to the glass being of such strength as to substantially prevent the scattering of glass fragments upon the shattering of the glass.

3. The process of reinforcing glass which consists in softening only the surface of a strong sheet of flexible celluloid with a volatile solvent and heavily pressing the plastic surface of the celluloid against a sheet of glass, the pressure applied being sufficiently heavy to produce a surface adhesion between the celluloid and glass such that the transparency of the glass is attained by the composite and the scattering of glass fragments on the shattering of the glass is prevented, substantially as described.

4. The process of manufacturing reinforced glass which comprises the steps of subjecting a sheet of celluloid to the action of a volatile celluloid solvent and then heavily pressing the thus softened surface of the celluloid directly against the face of a sheet of glass whereby a direct adhesion between the glass and celluloid is obtained substantially throughout their coextensive areas.

In testimony whereof I have signed my name to this specification, in the presence of two subscribing witnesses.

EDOUARD BENEDICTUS.

Witnesses:
CHARLES IRWIN,
JACQUES SIGOURNEY.